United States Patent [19]

Eggleston

[11] Patent Number: 4,978,837
[45] Date of Patent: Dec. 18, 1990

[54] METHOD AND APPARATUS FOR ELECTRICALLY HEAT WELDING THERMOPLASTIC FITTINGS

[75] Inventor: Dean E. Eggleston, Tecumseh, Okla.

[73] Assignee: Central Plastics Company, Shawnee, Okla.

[21] Appl. No.: 508,419

[22] Filed: Apr. 13, 1990

[51] Int. Cl.$^5$ .............................................. H05B 1/02
[52] U.S. Cl. ...................................... 219/497; 219/535
[58] Field of Search ............... 219/497, 535, 506, 494, 219/505, 544, 499, 501; 156/379.7, 380.1

[56] References Cited

U.S. PATENT DOCUMENTS

| | | | |
|---|---|---|---|
| 4,147,926 | 4/1979 | Stahli | 219/535 |
| 4,334,146 | 6/1982 | Sturm | 219/492 |
| 4,486,650 | 12/1984 | Bridgstock | 219/544 |
| 4,602,148 | 7/1986 | Ramsey | 219/535 |
| 4,642,155 | 2/1987 | Ramsey | 156/359 |
| 4,684,789 | 8/1987 | Eggleston | 219/497 |
| 4,695,335 | 9/1987 | Lyall | 219/535 |
| 4,943,706 | 7/1990 | Lyall et al. | 219/535 |

Primary Examiner—Roy N. Envall, Jr.
Attorney, Agent, or Firm—Laney, Dougherty, Hessin & Beavers

[57] ABSTRACT

An improved method and apparatus for electrically heat welding a thermoplastic fitting having an electric resistance heating element disposed therein. A controlled quantity of electric power is supplied to the heating element during the welding process to insure the making of a high quality weld. After the size of heating element and fitting are determined, a substantially constant voltage level electric power is supplied to the heating element of the fitting. When it is determined that the welding process is proceeding abnormally, the supply of electric power is terminated unless the abnormality is that the current level is too high. In that case, instead of terminating the welding process, the voltage of the electric power is reduced to that which results in current levels substantially equal to predetermined current levels for the size of heating element and fitting being welded which often results in a good weld being obtained even where the heating element is partially shorted out. Also, fires and other problems which have heretofore resulted due to such short circuits are prevented.

26 Claims, 2 Drawing Sheets

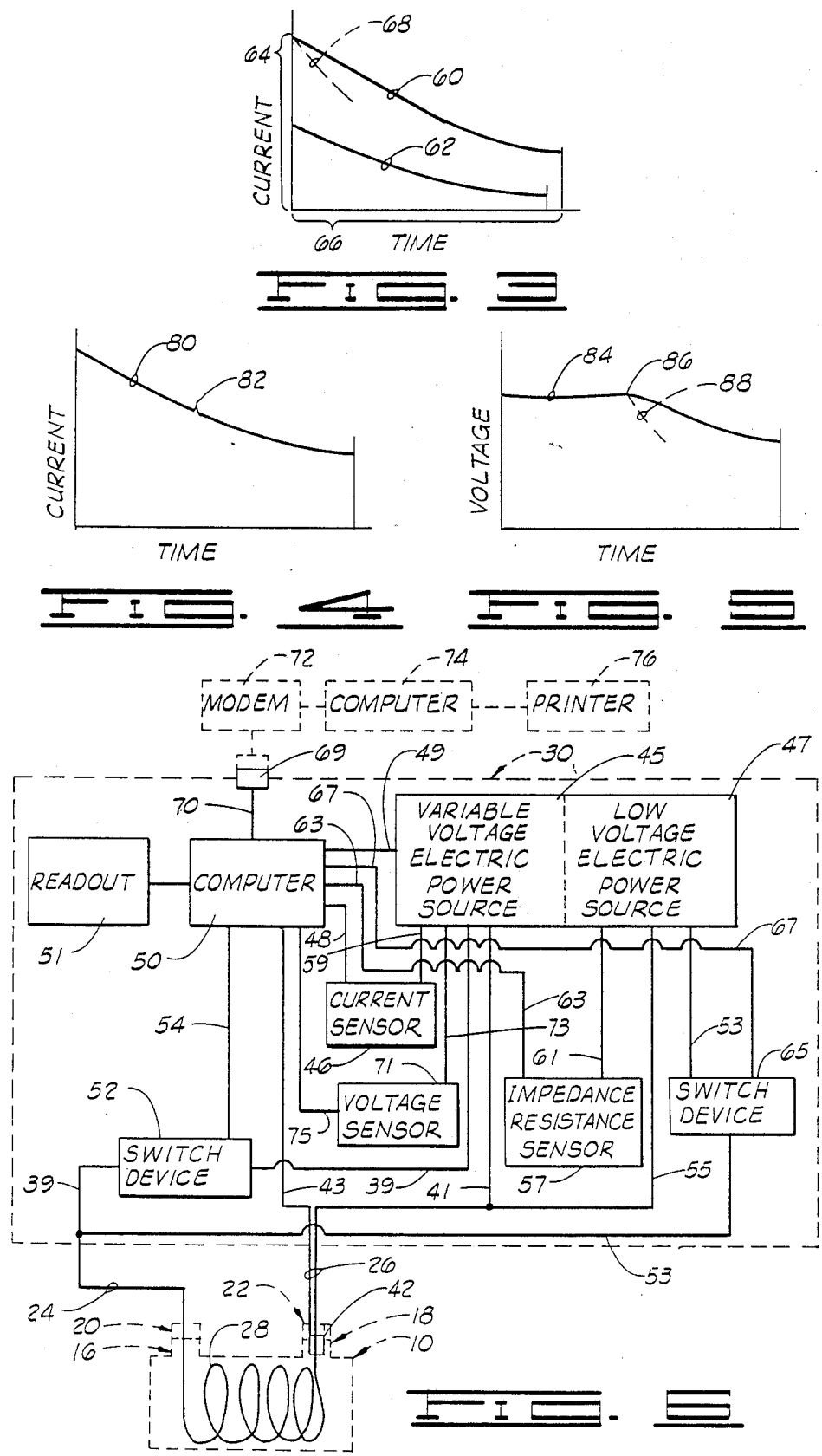

METHOD AND APPARATUS FOR ELECTRICALLY HEAT WELDING THERMOPLASTIC FITTINGS

BACKGROUND OF THE INVENTION

1. Field of the Invention

The present invention relates to methods and apparatus for electrically heat welding thermoplastic fittings, and more particularly, to improved methods and apparatus for automatically electrically heat welding thermoplastic fittings to other thermoplastic members such as pipe sections.

2. Description of the Prior Art

Electric heat weldable fittings formed of thermoplastic material have been developed and used heretofore. Such fittings generally include an electric resistance heating coil or element positioned adjacent the inside surfaces of the fitting which are to be welded to one or more other thermoplastic members such as pipe joints. The electric resistance heating element is usually a coil of resistance wire disposed in the thermoplastic material of the fitting. Electric contacts are attached to an outside surface of the fitting so that a source of electric power can be applied to the heating coil. Examples of electric heat weldable thermoplastic fittings are described in U.S. Pat. No. 4,147,926 issued Apr. 3, 1979 and U.S. Pat. No. 4,349,219 issued Sept. 14, 1982.

When electric power is applied to the resistance heating element of a fitting, the heating element heats the fitting and adjacent portions of thermoplastic members to temperatures which cause the thermoplastic materials from which the fitting and adjacent members are formed to melt whereby they become fused or welded together. The quality of the weld which results is primarily dependent upon the correct quantity of electric power being supplied to the heating element of the fitting. If too little electric power is supplied, an inadequate low strength weld results. If too much electric power is supplied, the fitting and adjacent members to which the fitting is welded can be overheated and deformed whereby a good weld does not result.

Various types of control and electric power generating apparatus have been utilized for supplying the electric power to electric heat weldable thermoplastic fittings. Initially, such apparatus were manually controlled by an operator and the quantities of electric power supplied to the heating elements of the fittings were determined by visual observation. More recently, control apparatus have been developed whereby the particular heating element and fitting to be welded are identified and electric power is supplied to the heating element in a preset quantity. For example, U.S. Pat. No. 4,602,148 issued July 22, 1986 and U.S. Pat. No. 4,631,107 issued Dec. 23, 1986, describe methods and apparatus which automatically identify the particular heating element and fitting to be welded, a controlled quantity of electric power is supplied to the heating element of the fitting and the welding process is monitored so that if an abnormality therein is detected, the welding process is terminated.

Improvements have been made to the methods and apparatus for electrically heat welding thermoplastic fittings of the type described above. For example, U.S. Pat. No. 4,642,155 issued Feb. 10, 1987 and U.S. Pat. No. 4,684,789 issued Aug. 4, 1987, disclose methods and apparatus which initially measure the resistance and/or impedance of the heating element using electric power at a minimum voltage level which does not significantly heat the element to more accurately determine the size of the fitting to be welded. In addition, the electric power supplied to the heating element of the fitting during the welding process is alternating current electric power which by adjusting the frequency thereof can be made to cause the vibration of the fitting which improves the quality of the weld obtained.

A problem which has not yet been solved in the electric heat welding of thermoplastic fittings involves the situation where the heating element of the fitting is partially shorted out as a result of improper installation or other reason. When electric power of substantially constant voltage is supplied to such heating elements and when a short circuit develops, the resistance of the heating element decreases which causes the current level to increase, often to a level whereby the ignition point of the thermoplastic material is reached and a fire or other dangerous condition occurs. While an automatic electric power apparatus of the type described above which determines abnormalities in the welding process terminates the welding process when a high current level is experienced, the end result is that the fitting and adjacent portions of pipe joints or the like must be replaced and the welding thereof repeated.

By the present invention improved methods and apparatus for electrically heat welding thermoplastic fittings to adjacent thermoplastic members are provided whereby when a short circuit in the heating element occurs, the current level is prevented from rising appreciably and controlled at a predetermined current level to prevent overheating and, in most cases, to complete the welding process whereby an acceptable weld is made.

SUMMARY OF THE INVENTION

Methods and apparatus for electrically heat welding thermoplastic fittings having electric resistance heating elements disposed therein are provided. The methods each basically comprise the steps of connecting the heating element of a fitting to an electric power source; sensing the initial temperature of the heating element of the fitting; supplying electric power to the heating element at a controlled substantially constant voltage whereby said heating element is heated; sensing the initial magnitude of the current flowing through the heating element and comparing such magnitude and the initial temperature of the element with predetermined current levels for heating elements of various sizes of fittings at various temperatures to thereby determine size of the fitting being welded, the total time the controlled substantially constant voltage should be supplied to the heating element and the current levels for such size of fitting which should result over the time period to ensure the making of a high quality weld; continuing to sense the magnitude of the current flowing through the heating element over the time period the electric power is supplied thereto and comparing such magnitude at predetermined time intervals with the predetermined current levels for the size and fitting being welded to thereby determine if the welding process is proceeding abnormally at such time intervals; terminating the supply of electric power to the heating element at the end of the total time period required to make a high quality weld or when it is determined that the welding process is proceeding abnormally unless the abnormality is that the current level is too high; and when the abnormality is that the current level is too high, reducing the voltage level to that which results in current levels substantially equal to the predetermined current levels for the remaining of the predetermined time and then terminating the supply of electric power to the heating element of the fitting.

In a preferred method, electric power is initially supplied to the heating element of the fitting at a minimum voltage level for measuring the impedance and optionally, the resistance of the heating element without significantly heating the element; the impedance and optionally, the resistance of the heating element are measured; and the size of the heating element and of the fitting are determined by comparing the measured impedance and optionally, the quality factor of the fitting with predetermined impedances and optionally, quality factors for various sizes of heating elements and fittings.

In a most preferred embodiment, the method also includes the steps of determining the deviation between the initial substantially constant voltage supplied to the heating element of the fitting being welded and the reduced voltage supplied thereto after an abnormality whereby the current level is too high has occurred, and providing an indication of a poor quality weld when the voltage deviation is greater than a predetermined voltage deviation for that size of fitting.

It is, therefore, the general object of the present invention to provide improved methods and apparatus for electrically heat welding thermoplastic fittings.

A further object of the present invention is the provision of methods of electrically heat welding thermoplastic fittings wherein abnormalities occurring during the welding process are detected and when a good quality weld cannot be obtained as a result, the welding process is terminated.

Yet another object of the present invention is the provision of methods of electrically heat welding thermoplastic fittings wherein when the welding process is determined to be abnormal but a good weld can still be obtained, the welding process is completed rather than being terminated.

Other and further objects, features and advantages of the present invention will be readily apparent to those skilled in the art upon a reading of the description of preferred embodiments which follows when taken in conjunction with the accompanying drawings.

BRIEF DESCRIPTION OF THE DRAWINGS

FIG. 3 is a graph showing the current-time relationships of different fittings.

FIG. 4 is a graph showing the current-time relationship of a particular fitting welded in accordance with the present invention wherein an abnormality resulting in the current being too high was detected.

FIG. 5 is a graph showing the voltage-time relationship for the fitting welded in accordance with the present invention which resulted in the current-time relationship shown in FIG. 4.

FIG. 6 is a schematic illustration of electric power and control apparatus for carrying out the method of the present invention connected to a thermoplastic fitting having a resistance heating element disposed therein.

DESCRIPTION OF PREFERRED EMBODIMENTS

Figure 1:
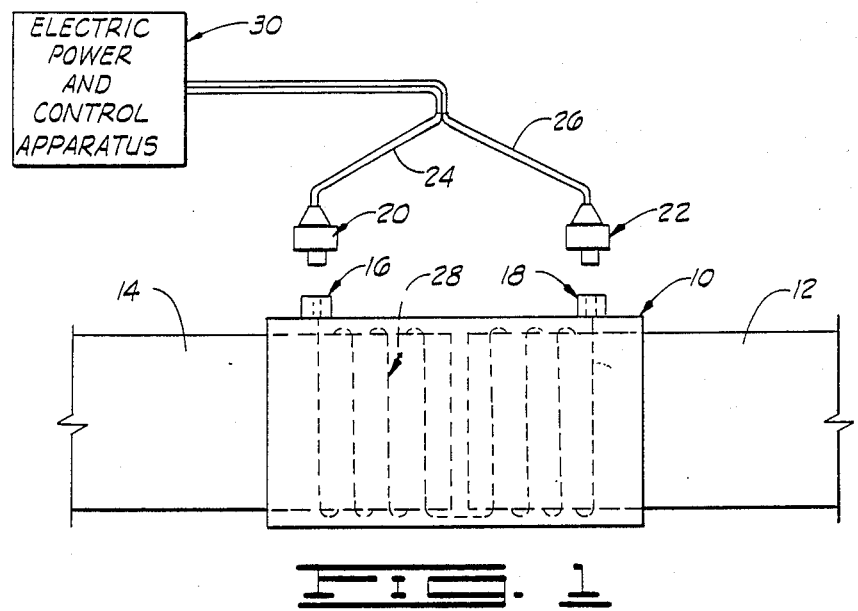
FIG. 1 is a side view of an electric heat weldable thermoplastic sleeve having the ends of a pair of pipe sections inserted therein with electric power and control apparatus illustrated schematically in relation thereto.
Figure 2:
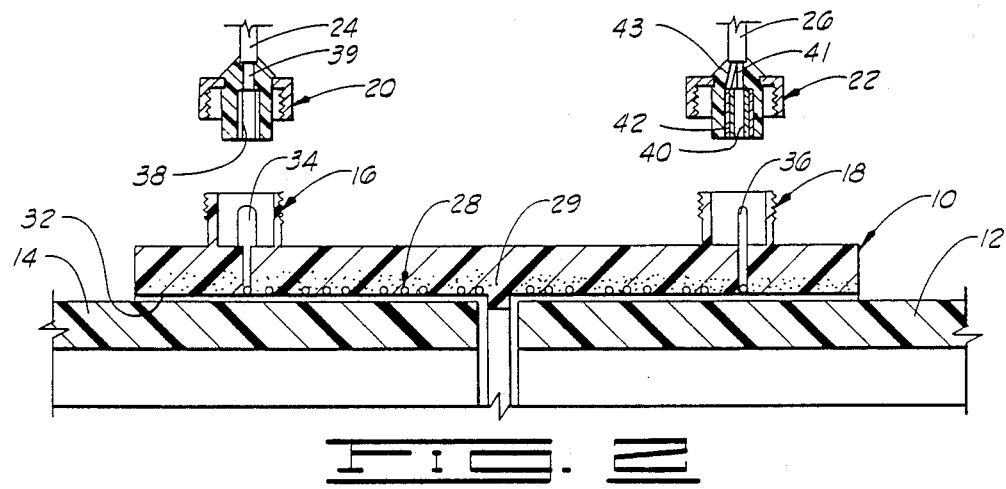
FIG. 2 is an enlarged cross-sectional view of portions of the fitting, plastic pipe sections and electric power and control apparatus of FIG. 1.

Referring now to the drawings, and particularly to FIGS. 1 and 2, an electric heat weldable thermoplastic sleeve 10 is illustrated with the ends of a pair of thermoplastic pipe sections 12 and 14 inserted therein. The sleeve 10 includes a pair of electric contact connectors 16 and 18 attached thereto for receiving complimentary electric connections 20 and 22 attached to the ends of electric cables 24 and 26, respectively. The cables 24 and 26 are connected to an electric power and control apparatus, generally designated by the numeral 30. As best shown in FIG. 2, the thermoplastic fitting 10 includes an electric resistance heating element 28 disposed therein adjacent portions of the interior surface 32 thereof. The resistance heating element 28 can take various forms, but preferably is a coil formed of electric resistance heating wire disposed in a spiral winding within the thermoplastic material forming the sleeve 10 adjacent the portions of the interior surface 32 which are to be welded to the exterior surfaces of the pipe sections 12 and 14. The opposite ends of the heating wire 28 are connected to upstanding electric contact pins 34 and 36 disposed within the connectors 16 and 18. The complimentary connectors 20 and 22 of the electric power and control apparatus 30 are adapted for removable connection to the connectors 16 and 18 of the sleeve 10.

The connectors 20 and 22 include electric contact sockets 38 and 40, respectively, for engagement with the electric contact pins 34 and 36 of the connectors 16 and 18. The socket contact 38 is connected to a wire 39 extending through the cable 24 and the socket contact 40 is connected to a wire 41 extending through the cable 26. The connector 22 also includes a temperature sensing device 42 such as a thermister, RTD, or thermocouple positioned in heat conducting relationship with the socket contact 40. The temperature sensing device 42 is connected to a multiple lead wire 43 also extending through the cable 26. The device 42 senses the temperature of the contact pin 36 when the socket contact 40 is engaged with the pin 36. That is, when the connector 22 is connected to the connector 18 of the sleeve 10, the temperature sensing device 42 senses an initial temperature which is representative of the temperature of the entire sleeve 10 including the heating element 28.

As will be described further hereinbelow, when the fitting 10 is to be fused or welded to the pipe sections 12 and 14, the connectors 20 and 22 attached to the cables 24 and 26 are removably connected to the connectors 16 and 18 of the sleeve 10 whereby an electric circuit is completed between the heating element 28 of the fitting 10 and the electric power and control apparatus 30. The electric power and control apparatus 30 provides electric power to the heating element 28 which causes the heating element to heat the thermoplastic materials forming the sleeve 10 and the ends of the pipe sections 12 and 14 inserted within the interior of the sleeve 10. The heating causes the thermoplastic materials of the fitting 10 and pipe sections 12 and 14 to melt and fuse together to thereby form welds between the fitting 10 and the pipe sections 12 and 14.

Referring now to FIG. 6, the electric power and control apparatus 30 of the present invention is illustrated connected to the heating element 28 of the sleeve 10 by way of the cables 24 and 26 and the connectors 16, 18, 20 and 22. The apparatus 30 includes a variable voltage electric power source 45 which is connected by the wires 39 and 41 extending through the cables 24 and 26 to the contact sockets 38 and 40 of the connectors 20 and 22. A low voltage electric power source 47 is also included in the apparatus 30 which is connected to the wires 39 and 41 by wires 53 and 55, respectively. The contact sockets 38 and 40 of the connectors 20 and 22 are connected to the contact pins 34 and 36 of the connectors 16 and 18 of the sleeve 10 which are in turn connected to the heating element 28 of the fitting 10.

A current sensor 46 for sensing the current flowing from the power source 45 to the heating element 28 is electrically connected to the power source 45 by a lead 59 with the output signal therefrom connected by a lead 48 to an electronic computer 50. The computer 50 is connected to the variable voltage electric power source 45 by a lead 49 by means of which the computer 50 controls the voltage level of the electric power supplied by the electric power source 45. A voltage sensor 71 for sensing the voltage of the electric power supplied by the electric power source 45 is connected thereto by a lead 73 with the output signal therefrom connected by a lead 75 to the computer 50. An impedance-resistance sensor 57 for sensing the impedance and resistance of the heating element 28 when minimum voltage electric power is applied thereto is electrically connected to the power source 47 by a lead 61 with the output signal therefrom connected to the computer 50 by a lead 63. The previously described temperature sensing device 42 is connected by the wire 43 attached thereto and extending through the cable 26 to the computer 50.

A switch device 52 such as a TRIAC or SCR is provided in the circuit between the heating element 28 and the power source 45 which is operably connected to the computer 50 by a lead 54. A similar switch device 65 is provided in the circuit connecting the power source 47 to the wires 39 and 41 which is connected to the computer 50 by a lead 67. The computer 50 includes a read-out module 51 operably connected thereto for visually indicating various modes of operation of the apparatus 30 such as a shut-down due to a defective fitting, etc. Also, the computer 50 is connected to a communication interface 69 by a lead 70 which in turn can optionally be connected to a modem 72, a second computer 74 and a printer 76.

In operation of the apparatus 30 for electrically heat welding the thermoplastic fitting 10 by means of the heating element 28 disposed therein, the connectors 20 and 22 are first connected to the connectors 16 and 18 of the fitting 10. When the apparatus 30 is turned on, the computer 50 first senses the temperature of the heating element 28 and the fitting 10 by way of the temperature sensing device 42 and lead 43. The computer 50 then closes the switch device 65 thereby completing a circuit between the low voltage electric power source 47 and the heating element 28 of the fitting 10 by way of the wires 39, 41, 53 and 55 connected therebetween. The low voltage electric power applied to the heating element 28 is initially alternating current and then direct current at minimum levels sufficient for the sensor 57 to measure the impedance and then the resistance of the element 28 without significantly heating the element 28. The impedance and resistance values so measured are communicated to the computer 50 by the lead 63 and the computer 50 then opens the switch 65.

The impedance of the heating element 28 is measured when alternating current at a preselected frequency is applied thereto. The impedance so measured can be used by itself to determine the size of fitting to be welded without measuring the direct current resistance. That is, the measured impedance of the heating element 28 can be compared by the computer 50 with predetermined heating element impedances for various sizes of elements and fittings to determine the size of the heating element 28 and fitting 10. Preferably, however, after the impedance of the heating element 28 is measured by the sensor 57, the low voltage electric power supplied to the heating element 28 is changed to direct current and the resistance of the heating element is measured. The measured resistance is used by the computer 50 along with the measured impedance to calculate the quality factor of the heating element 28. The quality factor is determined by dividing the impedance by the resistance, and such factor is compared by the computer 50 to predetermined quality factors for various sizes of heating elements and fittings to determine the size of the heating element 28 and fitting 10 to be welded. While as stated above, the impedance alone can be used to determine the size of the heating element and the fitting to be welded, it is preferred that the computer 50 first determine such size using an impedance and then confirm the size using the calculated quality factor for the heating element as described above. The computer 50 can also confirm the initial temperature sensed by the device 42 using the measured resistance by comparing such resistance with predetermined resistances at various temperatures for the size of heating element and fitting to be welded as determined from the measured impedance and/or quality factor.

The computer 50 next closes the switch device 52 thereby completing a circuit between the variable voltage electric power source 45 and the heating element 28 by way of the wires 39 and 41 connected therebetween. The electric power supplied by the electric power source 45 is controlled by the computer 50 at a preselected substantially constant voltage level, e.g., 40 volts. The initial magnitude of the current flowing through the heating element 20 as a result of the substantially constant voltage electric power supplied thereto is sensed by the computer 50 by means of the current sensor 46 and lead 48. The initial temperature of the heating coil 28 and the initial magnitude of the current flowing therethrough are compared by the computer 50 with predetermined current levels for the size of fitting being welded at various temperatures to again determine and confirm the size of the fitting being welded. In the event the determinations and confirmations of the size of fitting being welded cannot be reconciled by the computer 50, the supply of substantially constant voltage electric power to the element 28 is terminated and the reason for the termination is indicated by the readout 51.

As will be understood, the size of the heating element 28 and the fitting 10 being welded can be determined solely as described above after the substantially constant voltage electric power is supplied to the heating element 28 by the electric power source 45. However, it is preferred that the size of the heating element and fitting first be determined from the quality factor thereof as described above, and that such size be confirmed after the substantially constant voltage electric power is supplied to the heating element. Once the size of the electric heating element 28 and fitting 10 has been determined and confirmed, the supply of the substantially constant voltage electric power to the element 28 is continued, and the total time such power should be supplied to the element 28 to insure the making of a high quality weld is determined by the computer 50.

Referring to FIG. 3, the current-time relationship during the making of a high quality weld for two different sizes of fittings using a standard substantially constant voltage electric power is illustrated graphically. The top curve, designated by the numeral 60, represents the welding process for a two-inch sleeve and the bottom curve, designated by the numeral 62, represents the welding process for a one-inch sleeve. As shown, the current levels are different for the different sizes of sleeve, and each size and type of electrically heat weldable thermoplastic fitting has a current-time relationship which is characteristic of that fitting when a high quality weld is formed using a proper quantity of substantially constant voltage electric power at the same voltage level.

The computer 50 includes resistance-temperature, impedance-temperature, time-temperature and current-time relationship information for a variety of electric heat weldable thermoplastic fittings in memory whereby the computer 50 can make the comparisons described above to initially determine the size of fitting being welded or to confirm such size. The computer 50 also determines the total time the controlled substantially constant voltage electric power should be supplied to a particular heating element for the making of a high quality weld from the information in memory and the initial temperature of the fitting. For example, referring to FIG. 3, if the initial magnitude of the current flowing through the heating element of a fitting is that designated by the numeral 64, the computer will confirm that the fitting is a two-inch sleeve represented by the curve 60. The computer will also then determine from the curve 60 that the total time the controlled substantially constant voltage electric power should be supplied to the heating element for the making of a high quality weld is the time designated by the numeral 66.

The computer 50 continues to sense the magnitude of the current flowing through the heating element of the fitting being welded over the time the controlled electric power is supplied thereto and compares such magnitude at predetermined time intervals with predetermined current levels for the size of fitting being welded. For example, in welding the two-inch sleeve represented by the curve 60 in FIG. 3, the computer compares the actual current levels with the current levels of the curve 60 at frequent predetermined time intervals. As long as the sensed current levels are substantially the same as the current levels in memory for the size of fitting being welded at the standard substantially constant voltage electric power, the computer continues the welding process to the time determined to be required for the making of a high quality weld, i.e., the time 66. If the sensed current levels indicate an abnormality in the welding process, i.e., a deviation from the current levels in memory of a magnitude indicating the welding process is proceeding abnormally, e.g., the deviation shown by the dashed line 68 of FIG. 3, the computer 50 terminates the welding process by turning off the electric power supplied to the fitting being welded. The termination and the reasons therefor are indicated by the computer 50 by way of the readout 51.

Heretofore, the welding process was terminated when any abnormality therein was indicated by the current levels experienced during the process. In the situation where the abnormality was that the current levels were too high as a result of the development of one or more shorts in the heating coil, the electric power had to be terminated in order to avoid exceeding the ignition point of the thermoplastic material. Even if the ignition point of the thermoplastic material was not exceeded, the thermoplastic material would be degraded by excess heat to the point where a poor quality weld would result.

In accordance with the method of the present invention, the electric power supplied to the fitting being welded is not terminated in the situation where the current level is too high. Instead, when an abnormally high current level in the welding process is determined by the computer 50, it reduces the voltage level of the electric power supplied to the fitting, and controls the voltage of the electric power at levels such that the current flowing through the heating element is maintained at the proper levels for a normal fitting. If the deviation in voltage required to control the current is less than a predetermined deviation, the computer 50 continues supplying electric power to the fitting while controlling the voltage thereof to maintain the predetermined current levels to the end of the time determined to be required for the making of a high quality weld. The computer 50 indicates by way of the readout 51 that an abnormally high current was detected which was prevented from remaining high by lowering the voltage of the electric power supplied to the fitting. Such high current will normally be the result of a short circuit in the heating element and because the current level was prevented from going too high, a good weld will normally result. Upon being informed by the readout 51 that a high current abnormality was detected, etc., the operator of the apparatus 30 can visually inspect the fitting 10 and the welds produced to insure that the welds are in fact good.

Referring to FIGS. 4 and 5, the current-time relationship (FIG. 4) and the voltage-time relationship (FIG. 5) during the making of a weld where an abnormality comprised of too high a current level was determined are illustrated graphically for the two-inch sleeve represented by the curve 60 of FIG. 3. As illustrated in FIG. 4, the currenttime curve 80 shows that the welding process proceeding normally for an initial time period to a point 82 where an abnormally high current level due to a short circuit in the heating element was determined. At the point 82, the computer 50 lowered the voltage of the electric power supplied to the fitting and controlled the voltage to maintain the current flowing through the heating coil at a constant level over the remaining time in the welding process. As shown in FIG. 5 by the curve 84, the voltage of the electric power supplied to the fitting was maintained at a substantially constant level for the initial normal portion of the welding process. At a point 86 corresponding to the point 82 of FIG. 4, the computer 50 lowered the voltage of the electric power supplied to the fitting to maintain the constant current levels illustrated in FIG. 4. If the deviation of the lowered voltage level from the normal substantially constant voltage level is greater than a predetermined deviation, as for example the deviation shown by dash line 88, the computer 50 would determine that the abnormality which caused the high current level was more than a partial short circuit of the heating element and terminate the welding process by activating the switch device 52.

In order to facilitate the making of a high quality weld, alternating current is preferably supplied to the heating element 28 of the fitting 10 being welded by the variable voltage electric power source 45 of the apparatus 30. The frequency of the alternating current is adjusted to that frequency which best causes the fitting being welded to vibrate as a result of the magnetic fields produced by the alternating current flowing through the heating element of the fitting. Such vibration facilitates and promotes the fusing of the softened thermoplastic materials of the fitting 10 and other thermoplastic members being welded thereto.

During and upon completion of the welding process described above, the computer 50 records in its memory the various temperatures, current magnitudes, corresponding times and other variables sensed and determined during the welding process. For example, the computer 50 can record the initial temperature of the heating element and fitting, the size of the fitting, the total time the substantially constant voltage electric power should be supplied; the magnitudes of current flowing over the time the substantially constant voltage electric power is supplied to the fitting; and when a high current level abnormality is detected, the time when it occurred, the lower levels of voltage required to maintain the current constant, the final temperature of the heating element, and the total time the electric power is supplied to the heating element. Such recorded information can be communicated to a second computer 74 at a remote location by way of the communication interface 69 and a modem 72 connected thereto. The information can be printed by a printer 76 connected to the computer 74 or utilized in any other desired way. If the supply of electric power is terminated as a result of the welding process proceeding abnormally, the nature of the abnormality will be apparent from the recorded information.

Thus, the present invention is well adapted to carry out the objects and attain the ends and advantages mentioned as well as those inherent therein. While presently preferred embodiments of the invention have been described for purposes of this disclosure, numerous changes in the arrangement of steps and parts can be made by those skilled in the art, which changes are encompased within the spirit of this invention as defined by the appended claims.

What is claimed is:

1. An improved method of electrically heat welding a thermoplastic fitting having an electric resistance heating element disposed therein whereby a predetermined regulated quantity of electric power is supplied to the heating element during the welding process comprising the steps of:
   (a) connecting said heating element of said fitting to an electric power source;
   (b) sensing the initial temperature of said heating element and said fitting;
   (c) supplying electric power to said heating element at a substantially constant voltage whereby said element is heated;
   (d) sensing the initial magnitude of the current flowing through said heating element and comparing such magnitude and said initial temperature of said heating element with predetermined current levels for heating elements of various sizes of fittings at various temperatures to thereby determine the size of said fitting being welded, the total time the controlled substantially constant voltage should be supplied to said heating element and the current levels for such size of fitting which should result over said time period to insure the making of a high quality weld;
   (e) continuing to sense the magnitudes of the current flowing through said heating element over the time said substantially constant voltage electric power is supplied thereto and comparing such magnitudes at predetermined time intervals with predetermined current levels for the size of fitting determined in step (d) to thereby determine if the welding process is proceeding abnormally at such time intervals; and
   (f) terminating the supply of electric power to said heating element at the end of the total time required to make a high quality weld or when it is determined that said welding process is proceeding abnormally in step (e) unless the abnormality is that the current level is too high; and
   (g) when the abnormality determined in step (e) is that the current level is too high, reducing said voltage to that which results in current levels substantially equal to said predetermined current levels for the size of said fitting being welded for the remaining of the time determined in step (d) and then terminating said supply of electric power to said heating element of said fitting.

2. The method of claim 1 which is further characterized to include the following steps after step (b) and prior to carrying out steps (c) through (g):
   supplying alternating current electric power to said heating element at a minimum voltage level for measuring the impedance of said heating element without significantly heating said element;
   measuring the impedance of said heating element; and
   determining the size of said heating element and said fitting by comparing the measured impedance with predetermined impedances for various sizes of elements and fittings.

3. The method of claim 2 which is further characterized to include the following additional steps after carrying out the steps of claim 2 and before carrying out steps (c) through (g):
   supplying direct current electric power to said heating element at a minimum voltage level for measuring the resistance of said element without significantly heating said element;
   measuring the resistance of said element;
   determining the quality factor of said heating element using said measured resistance and said measured impedance thereof; and
   comparing said determined quality factor with predetermined quality factors for various sizes of elements and fittings to thereby confirm the size of said element.

4. The method of claim 1 wherein the current of said substantially constant voltage electric power supplied to said heating element in step (c) is alternating current.

5. The method of claim 4 wherein the frequency of said alternating current is at a level such that said fitting is caused to be vibrated by the magnetic fields produced thereby during said welding.

6. The method of claim 1 which is further characterized to include the steps of:
   determining the deviation between the voltage of the initial substantially constant voltage electric power supplied to said heating element in accordance with step (c) and the reduced voltage electric power supplied thereto in accordance with step (g); and terminating the supply of said electric power to said heating element when said deviation is greater than a predetermined deviation for the size of fitting being welded.

7. A method of electrically heat welding a thermoplastic fitting having an electric resistance heating element disposed therein whereby a predetermined regulated quantity of electric power is supplied to the heating element during the welding process comprising the steps of:

(a) connecting said heating element of said fitting to an electric power source;

(b) sensing the initial temperature of said heating element of said fitting;

(c) supplying alternating current electric power to said heating element at a minimum voltage level for measuring the impedance of said element without significantly heating said element;

(d) measuring the impedance of said heating element;

(e) determining the size of said heating element and said fitting by comparing the impedance measured in step (d) with predetermined impedances for various sizes of elements and fittings;

(f) supplying electric power to said heating element at a substantially constant voltage whereby said element is heated;

(g) sensing the initial magnitude of the current flowing through said heating element and comparing such magnitude and said initial temperature of said element with predetermined current levels for heating elements of various sizes of fittings at various temperatures to thereby confirm the size of said fitting being welded, to determine the total time the substantially constant voltage electric power should be supplied to said heating element and to determine the current levels for such size of fitting which should result over said time period to insure the making of a high quality weld;

(h) continuing to sense the magnitudes of the current flowing through said heating element over the time said substantially constant voltage electric power is supplied thereto and comparing such magnitudes at predetermined time intervals with predetermined current levels for the size of heating element and fitting confirmed in step (g) to thereby determine if the welding process is proceeding abnormally at such time intervals;

(i) terminating the supply of electric power to said heating element at the end of the total time required to make a high quality weld or when it is determined that said welding process is proceeding abnormally in step (h) unless the abnormality is that the current level is too high; and (j) when the abnormality is that the current level is too high, reducing said voltage level to that which results in current levels substantially equal to said predetermined current levels for the remaining of the predetermined time determined in step (g) and then terminating said supply of electric power to said heating element of said fitting.

8. The method of claim 6 which is further characterized to include the following steps after step (e) and prior to carrying out steps (f) through (j):

supplying direct current electric power to said heating element at a minimum voltage level for measuring the resistance of said element without significantly heating said element;

measuring the resistance of said element;

determining the quality factor of said heating element using said measured resistance and said measured impedance thereof; and comparing said determined quality factor with predetermined quality factors for various sizes of heating elements and fittings to thereby confirm the size of said element and fitting.

9. The method of claim 8 wherein the current of said controlled voltage electric power supplied to said heating element in step (f) is alternating current.

10. The method of claim 9 wherein the frequency of said alternating current is at a level such that said fitting is caused to be vibrated by the magnetic fields produced thereby during said welding.

11. The method of claim 10 which is further characterized to include the step of recording information relating to said welding process.

12. The method of claim 7 which is further characterized to include the steps of:

determining the deviation between the voltage of the initial substantially constant voltage electric power supplied to said heating element in accordance with step (c) and the reduced voltage electric power supplied thereto in accordance with step (g); and terminating the supply of said electric power to said heating element when said deviation is greater than a predetermined deviation for the size of fitting being welded.

13. An improved method of electrically heat welding a thermoplastic fitting having an electric resistance heating element disposed therein whereby a predetermined regulated quantity of electric power is supplied to the heating element during the welding process comprising the steps of:

(a) connecting said heating element of said fitting to an electric power source;

(b) sensing the initial temperature of said heating element and said fitting;

(c) supplying alternating current electric power to said heating element at a minimum voltage level for measuring the impedance of said element without significantly heating said element;

(d) measuring the impedance of said heating element;

(e) supplying direct current electric power to said heating element at a minimum voltage level for measuring the resistance of said element without significantly heating said element;

(f) measuring the resistance of said heating element;

(g) determining the quality factor of said heating element using the impedance measured in step (d) and the resistance measured in step (f);

(h) comparing the quality factor determined in step (g) with predetermined quality factors for various sizes of heating elements and fittings to thereby determine the size of heating element and fitting to be welded;

(i) confirming the sensed initial temperature of said heating element and fitting by comparing the resistance measured in step (f) with predetermined resistances for various temperatures of the size of heating element and fitting determined in step (h);

(j) supplying electric power to said heating element at a controlled substantially constant voltage level whereby said element is heated;

(k) sensing the initial magnitude of the current flowing through said heating element and comparing such magnitude and said initial temperature of said heating element with predetermined current levels for heating elements of various sizes of fittings at various temperatures to thereby confirm the size of said heating element and said fitting as being the size initially determined in accordance with step (h), to determine the total time the controlled substantially constant voltage electric power should be supplied to said heating element and to determine the current levels for such heating element and fitting which should result over said time period to insure the making of a high quality weld;

(l) continuing to sense the magnitudes of the current flowing through said heating element over the time said controlled substantially constant voltage electric power is supplied thereto and comparing such magnitudes at predetermined time intervals with the predetermined current levels for the size of fitting being welded to thereby determine if the welding process is proceeding abnormally at such time intervals; and (m) terminating the supply of electric power to said heating element at the end of the total time required to make a high quality weld or when it is determined that said welding process is proceeding abnormally in step (l) unless the abnormality is that the current level is too high; and (n) if the abnormality is that the current level is too high, reducing said voltage to that which results in current levels substantially equal to said predetermined current levels for the remaining of said predetermined time period, and then terminating said supply of electric power to said heating element of said fitting.

14. The method of claim 13 wherein the current of said controlled substantially constant voltage electric power supplied to said heating element of said fitting is alternating current.

15. The method of claim 14 wherein the frequency of said alternating current is at a level such that said fitting is caused to be vibrated by the magnetic fields produced thereby during said welding process.

16. The method of claim 15 which is further characterized to include the step of recording information relating to said welding process comprising at least the initial temperature of said heating element and fitting as determined in step (a), the size of said fitting as determined in step (h), the total time the controlled voltage electric power should be supplied to said fitting as determined in step (k), the magnitudes of the actual current levels over the total time electric power is supplied to said heating element as sensed in step (l) and the total time electric power is supplied to said heating element of said fitting.

17. The method of claim 13 which is further characterized to include the steps of:

determining the deviation between the voltage of the initial substantially constant voltage electric power supplied to said heating element in accordance with step (c) and the reduced voltage electric power supplied thereto in accordance with step (g); and terminating the supply of said electric power to said heating element when said deviation is greater than a predetermined deviation for the size of fitting being welded.

18. Apparatus for electrically heat welding a thermoplastic fitting having an electric resistance heating element disposed therein connected to a pair of electric contacts attached to said fitting whereby a regulated quantity of electric power is supplied to the heating element during the welding process comprising:

(a) first electric power generating means for producing variable voltage electric power to heat said heating element of said fitting;

(b) current sensor means for sensing the magnitude of the current flow from said first electric power generating means electrically connected thereto;

(c) voltage sensor means for sensing the magnitude of the voltage of the electric power produced by said first electric power generating means electrically connected thereto;

(d) electric cable means connected to said first electric power generating means and adapted for removable connection to said electric contacts of said fitting for conducting electric power to said electric resistance heating element of said fitting;

(e) switch means electrically connected between said first electric power generating means and said cable means;

(f) temperature sensing means attached to said cable means and adapted for connection to at least one of said electric contacts of said fitting to thereby sense the temperature of said heating element and said fitting; and (g) computer means, operably connected to said current, voltage and temperature sensor means and to said switch means, for receiving and comparing the initial temperature of said heating element and the initial magnitude of the current flowing from said first electric power generating means through said heating element when electric power at a substantially constant voltage is supplied thereto with predetermined temperatures and current levels for heating elements of various sizes of fittings at various temperatures to thereby determine the size of fitting being welded, for determining the total time the substantially constant voltage power from said first power generating means should be supplied to said heating element for the making of a high quality weld, for comparing the magnitude of the current flowing through said heating element from said first power generating means at predetermined time intervals with predetermined current levels for the size of fitting being welded to thereby determine if the welding process is proceeding abnormally at such time intervals, for operating said switch means to start the supply of electric power to said heating element from said first power generating means, for operating said switch means to terminate the supply of electric power to said heating element from said first electric power generating means at the end of the total time determined to be required for the making of a high quality weld or when said welding process is proceeding abnormally unless said abnormality is that the current level is too high, and for reducing the voltage of the electric power supplied to said heating element when said current level is too high to that voltage which results in current levels substantially equal to said predetermined current levels for the remaining of the predetermined time required for the making of a high quality weld.

19. The apparatus of claim 18 which is further characterized to include:
  second electric power generating means for producing low voltage electric power;
  resistance sensor means for sensing the resistance of said heating element when electrically connected to said second electric power generating means;
  electric wire means connecting said second electric power generating means to said electric cable means of element (e) for removable connection to said electric contacts of said fitting;
  switch means electrically connected between said second electric power generating means and said cable means; and
  said computer means being operably connected to said second electric power generating means, to said resistance sensor means and to said switch means for receiving the resistance of said heating element and determining the size of said heating element and fitting to be welded therefrom.

20. The apparatus of claim 19 which is further characterized to include:
  impedance sensor means for sensing the impedance of said heating element electrically connected to said second electric power generating means; and
  said computer means being operably connected to said impedance sensor means for receiving the impedance of said heating element and determining the size of said heating element and fitting to be welded therefrom.

21. The apparatus of claim 20 wherein said first electric power generating means produces alternating current or direct current.

22. The apparatus of claim 21 wherein said second electric power generating means produces both alternating current or direct current.

23. Apparatus for electrically heat welding a thermoplastic fitting having an electric resistance heating element disposed therein connected to a pair of electric contacts attached to said fitting whereby a regulated quantity of electric power is supplied to the heating element during the welding process comprising:
  (a) first electric power generating means for producing variable voltage electric power to heat said heating element of said fitting;
  (b) second electric power generating means for producing low voltage electric power for measuring the impedance and resistance of said heating element without significantly heating said element;
  (c) current sensor means for sensing the magnitude of the current flow from said first electric power generating means electrically connected thereto;
  (d) impedance and resistance sensor means for sensing the magnitude of the impedance and resistance of said heating element electrically connected to said second electric power generating means;
  (e) voltage sensor means for sensing the magnitude of the voltage of the electric power produced by said first electric power generating means electrically connected thereto;
  (f) electric cable means connected to said first and second electric power generating means and adapted for removable connection to said electric contacts of said fitting for conducting electric power to said electric resistance heating element of said fitting;
  (g) switch means electrically connected between said first and second electric power generating means and said cable means;
  (h) temperature sensing means attached to said cable means and adapted for connection to at least one of said electric contacts of said fitting to thereby sense the temperature of said heating element and said fitting; and
  (i) computer means, operably connected to said current, voltage and temperature sensor means, to said impedance and resistance sensor means and to said switch means, for receiving the impedance and resistance of said heating element and determining the size of said heating element and fitting to be welded therefrom, for receiving and comparing the initial temperature of said heating element and the initial magnitude of the current flowing from said first electric power generating means through said heating element when electric power at a substantially constant voltage is supplied thereto with predetermined temperatures and current levels for heating elements of various sizes of fittings at various temperatures thereby determine and confirm the size of fitting being welded, for determining the total time the substantially constant voltage electric power from said first power generating means should be supplied to said heating element for the making of a high quality weld, for comparing the magnitudes of the current flowing through said heating element from said first power generating means at predetermined time intervals with predetermined current levels for the size of fitting being welded to thereby determine if the welding process is proceeding abnormally at such time intervals, for operating said switch means to start and terminate the supply of electric power to said heating element from said first and second electric power generating means, for operating said switch means to terminate the supply of electric power to said heating element from said first electric power generating means at the end of the total time determined to be required for the making of a high quality weld, when said welding process is proceeding abnormally unless such abnormality is that the current level is too high, and if the abnormality is that the current level is too high, for reducing the voltage to that voltage which results in current levels substantially equal to said predetermined current levels for the remaining of said predetermined time required for the making of a high quality weld.

24. The apparatus of claim 23 wherein said first electric power generating means produces alternating.

25. The apparatus of claim 24 wherein said second electric power generating means produces alternating current or direct current.

26. The apparatus of claim 25 wherein the frequency of said alternating current produced by said first electric power generating means is at a level such that said fitting is vibrated by the magnetic fields produced thereby during said welding process.

* * * * *